Nov. 15, 1966   R. L. PLOEGER ET AL   3,284,991
ULTRASONIC DEGASSING OF LIQUIDS
Filed Dec. 19, 1963

INVENTORS.
Raymond L. Ploeger
and Theodore Melot
BY
Edward E. Schilling
Agent 3,284,991
ULTRASONIC DEGASSING OF LIQUIDS
Raymond L. Ploeger, Decatur, Ala., and Theodore Melot, Lake Jackson, Tex., assignors to The Dow Chemical Company, Midland, Mich., a corporation of Delaware
Filed Dec. 19, 1963, Ser. No. 331,783
11 Claims. (Cl. 55—15)

The invention relates to the continuous ultrasonic degassing of a flowing liquid stream and has particular application to removing difficultly removable entrained gas bubbles from a stream of a liquid. Simple removal of entrained gas bubbles in a settling tank usually is difficult if the gas bubbles in a non-viscous liquid are smaller than about 0.1 millimeter diameter. Almost all sizes of entrained gas bubbles are difficult to remove from a liquid having a viscosity greater than about 5 centipoises.

Heretofore, liquids have been degassed by spraying or boiling the liquids or by reducing the atmospheric pressure above the liquid. These are relatively expensive procedures. Ultrasonic methods of degassing liquids have not been widely applied to liquid streams because it has not been possible to degas a stream without a large power consumption. The only satisfactory degassing of liquids accomplished heretofore by ultrasonic methods has been by batch processing, which is not desirable in a production operation because it is both more expensive and discontinuous.

It is therefore a principal object of the present invention to overcome the difficulties previously encountered by the prior art by providing an improved method and apparatus for thoroughly but economically degassing a flowing liquid.

Another object is to provide an improved method and apparatus for continuously ultrasonically degassing a flowing liquid stream without high power consumption.

Still another object of the invention is to provide an improved method and apparatus by means of which a flowing stream of liquid is degassed ultrasonically in a continuous process.

Figure 1:
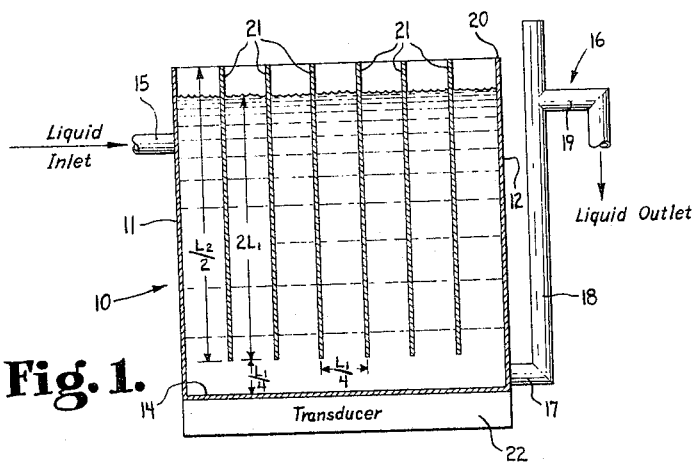

These and other objects and advantages of the present invention will be more fully understood upon becoming familiar with the following description, reference being had to the drawings in which, FIG. 1 is a vertical sectional view through an embodiment of the apparatus of the invention including a tank and baffles. The view in FIG. 1 is taken along the line 1—1 of the top plan view of the apparatus shown in FIG. 2, and FIG. 3 is a vertical sectional view, similar to the view shown in FIG. 1, showing a different embodiment of the present apparatus.

The present invention is based on the provision and use of a tank having fluid inlet and outlet means, an ultrasonic transducer coupled to the bottom of the tank and especially on baffle means and fluid level control means arranged and disposed so as to provide a highly resonant system within the tank, as hereinafter more fully described.

Figure 2:
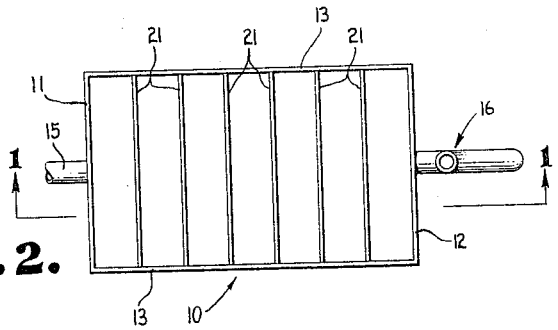
Figure 3:
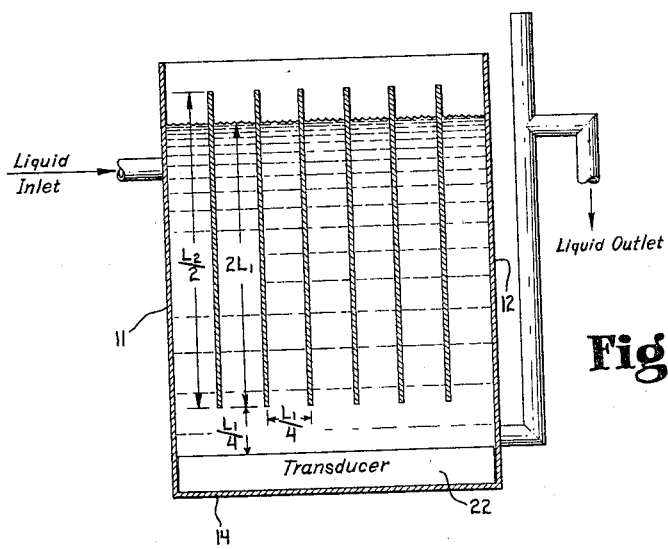

Referring to FIGS. 1 and 2 of the invention, the apparatus employed in the present method consists of a generally rectangular tank indicated generally by the numeral 10, provided with endwalls 11, 12 and sidewalls 13 and a bottomwall 14. The tank 10 is provided with a liquid inlet 15 which is disposed in the end wall 11 adjacent the upper end thereof. The liquid inlet 15 communicates with the interior of the tank. Liquid outlet means indicated generally by the numeral 16 is disposed in the endwall 12 adjacent the bottom of the tank. The liquid outlet means is preferably designed to make maintenance of a preselected liquid level a relatively easy matter. Most any liquid level control means will do. As shown, the outlet means consists of an unsiphonable seal loop swing line consisting of a horizontal pipe section 17 extending transversely from the endwall 12, an upright standpipe portion 18 connected to and communicating with the short section 17, and a horizontal pipe section 19 which is connected to and communicates with the pipe section 18 at a point somewhat below the level of the top 20 of the tank. The horizontal pipe section 19 is connected by any appropriate pipe means to a pipeline, a storage tank, or other suitable vessel. Positioned within the tank are a series of baffle plates 21. Coupled to the bottom of the tank is a transducer 22 adapted to transmit ultrasonic energy of an appropriate frequency to the tank and its contents.

The tank is generally regular in shape, having a depth and width of about equal dimensions, the width being sufficient to handle the flow of liquid to be degassed. For a very large volume of liquid flow where space requirements are restricted, two or more tanks may be connected in parallel by means of appropriate headers, or a much wider tank with multiple inlets may be employed to handle the larger flows.

The tank may be fabricated in any ordinary way and can be built of any metal or alloy reasonably resistant to the corrosive action of the liquid and to the cavitation attack of the ultrasonic energy. Usually the tank is made of stainless steel or other suitable nickel steel.

The transducer employed may be either an ultrasonic transducer which may be affixed to the underside of the tank bottom as illustrated in FIG. 1, or a submersible type of ultrasonic transducer which is placed in the tank and on the bottom thereof as illustrated in FIG. 3.

The baffle plates disposed in the tank can be made of the same material as the tank or of a different metal or alloy, or of a plastic, i.e., a polymerized resin material. The baffle plates may be of any thickness required by the hydraulics of the system.

The critical aspects of obtaining maximum efficiency in the apparatus and method of the present invention include the vertical spacing of the baffles above the bottom of the tank, the minimum number of baffles employed, the frequency of the ultrasonic energy applied, the power output of the ultrasonic transducer which is used and the maximum rate of flow of liquid permitted through the apparatus. Other factors which are important in obtaining maximum efficiency, but which are not sharply critical, include the vertical length of the baffles, baffle thickness and the height of the liquid in the tank.

The liquid level in the tank is best maintained at a height equal to an odd number of quarter wavelengths of the sound wave in the liquid being treated. At such a height, the sound wave will encounter the liquid surface at a node and maximum reflection of the sound wave will take place, although bubbles accumulating between baffles do reflect quite a bit of the energy before it gets to the top of the liquid. To minimize the disturbance of the resonance in the liquid in the tank, the liquid entering the tank is best brought in at such a height that most of its turbulence will be dissipated before it begins to flow across the bottom of the tank.

The baffles are disposed in the tank so that the lower edges of the baffles clear the bottom of the tank sufficiently that the liquid travels underneath the baffles in moving from the liquid inlet to the liquid outlet. For the sake of resonance, the baffles must clear the bottom of the tank by an odd number of quarter wavelengths of the sound wave in the liquid. For the ultrasonic frequencies produced by the transducers customarily used, the baffles will generally be placed one quarter wavelength above the bottom of the tank.

With respect to the fluid flow in the tank, the baffles are usually disposed transversely, that is normal, to the direction of the flow of liquid entering the tank and moving toward the outlet. The baffles should be sealingly attached to the sidewalls of the tank, although if structural support is not needed, it suffices for the baffles to extend entirely from sidewall to sidewall; provided substantially none of the liquid leaks past the juncture of baffle and sidewall.

The baffles preferably have a length equal to an even number of quarter wavelengths of sound wave in the baffle material so that the top of the baffle is at a node for maximum reflection of energy back toward the bottom of the tank.

If desired, the baffles may be disposed at the same height as the walls of the tank as shown in FIG. 1, or the baffles may be disposed at a different relative height as shown in a different embodiment of the present apparatus as illustrated in FIG. 3.

The number of baffle plates employed must be sufficient to accomplish the degree of degassing desired. The desired number of baffles are readily determined by trial and error, plates being added until it is found that the liquid flowing from the outlet is substantially or completely degassed. Use of more than the minimum number of plates required is not particularly deleterious or disadvantageous. The best results appear to be obtained when the baffles are spaced apart about a quarter wavelength of the sound in the liquid, although the spacing is not sharply critical. Since the space between the baffles is a gas reservoir which can hold only so much, the optimal baffle spacing is also determined by the gas loading of the liquid entering the tank, and the temperature and viscosity of the liquid.

While it is not critical that the baffles are disposed precisely in the vertical direction or that they are disposed precisely transverse to the direction of liquid flow, it is essential that the baffles (1) prevent the horizontal travel of gas bubbles between the endwalls, (2) that they force the liquid to travel along the bottom of the tank where the intensity of the ultrasonic energy is greatest, and (3) that they create a series of static reservoirs of liquid in which the coalesced and expanded bubbles may rise out of the flowing liquid and move to the top surface of the liquid and in which the defining walls or surfaces together with the bubbles form a reflecting surface back across the flowing liquid, thereby obtaining even greater resonance and a stronger energy intensity and thus a higher efficiency.

In determining the dimensions of the tank and the baffles therein, it is necessary to determine the velocity of sound in the liquid being treated. The sonic wavelength for the particular type of energy source selected is calculated according to the following equation:

$$L = \frac{12V}{F}$$

where $L$ = wavelength in inches,
$V$ = velocity of sound in the liquid in feet per second
$F$ = frequency of applied energy in cycles per second.

The sonic wavelength of sound in the baffle material is calculated in a similar manner by using the same formula, but using for the value of $V$ the velocity of sound in the baffle material.

On the basis of placing the baffles at $L/4$ inch from the bottom of the tank and on the basis of the flow rate desired, the width of tank needed may be calculated to meet the requirement that the Reynolds number of the liquid will be less than 2100 and preferably is about 1000.

$$\text{Reynolds No.} = \frac{DeVP}{Z}$$

where $V$ = velocity of liquid in feet per second,
$De$ = equivalent diameter in feet,
$P$ = density of clear liquid in pounds per cubic foot
$Z$ = viscosity of liquid in pounds per second-foot.

The equivalent diameter is equal to four times the hydraulic radius $R_h$ (in feet). The hydraulic radius is determined according to the following equation:

$$R_h = \frac{by}{2(b+y)}$$

where $b$ = width of tank in feet,
$y$ = depth of liquid below baffles preferably $L/4$.

As an example of suitable relative spacings and dimensions of parts, as illustrated in FIGS. 1 and 3 in the drawing, the baffles may be as long vertically as one-half the sonic wavelength in the baffle material ($L_2$), the dynamic liquid level is sufficient to provide a liquid depth 2¼ times the wavelength of the ultrasonic energy transmitted by the liquid ($L_1$), the depth of liquid below the baffles is a quarter wavelength, $L_1/4$, and the baffles are spaced a quarter wavelength, $L_1/4$, apart.

In using the apparatus of the present invention, the tank, baffles and transducer having been selected of appropriate dimensions and positioned all as described above, the liquid carrying entrained gas bubbles is brought in through the liquid inlet at an appropriate rate to bring the dynamic liquid level in the tank to a height at which the turbulence of flow largely dissipates before the incoming liquid reaches the lower part of the tank. Preferably this height is equal to an odd number of quarter wavelengths of the ultrasonic sound wave produced in the liquid by the transducer. The requisite number of baffles is employed so that the flowing liquid leaving the tank at the liquid outlet is substantially free of entrained gas. If necessary, final fine adjustments are made in baffle clearance, above the tank bottom, and in the liquid level, to obtain maximum clarity.

The ultrasonic transducer employed may be either a piezoelectric or magnetostrictive type transducer as the efficiency of both types is about the same. Suitable sound frequencies employed are of the order of 15,000 to 30,000 cycles per second, preferably about 18,000 to 25,000 cycles per second. The power intensity applied to the liquid should be of the order of at least 1 watt per square inch. Power intensities of 50 watts per square inch and above may be used, but are not believed to be necessary. The higher power intensities would be undesirable in attempting to carry out the most economical operation. More desirable power intensities are in the range of about 2–10 watts per square inch.

As an example of the method and process of the invention, a tank was prepared from #304 stainless steel sheet ¹⁄₁₆ inch thick. The tank was 6 inches wide, 10 inches deep and 10 inches long. The tank was provided with liquid inlet and outlet means similar to that shown in the drawings. The apparatus was designed for maintenance of a dynamic liquid depth of 9 inches. The liquid sought to be degassed was a 50 percent caustic soda (aqueous solution) which was brought to the tank at a temperature of 82° C. and with an amount of gas loading equal to 4 percent of the liquid volume, that is, the total volume of the entrained gas bubbles in the liquid at atmospheric pressure was equal to 4 percent of the liquid volume. The amount of power applied to the bottom of the tank by an ultrasonic transducer coupled to the outside of the bottom of the tank and operating at a frequency of 20,000 cycles per second was 150 watts.

Baffles 6 inches wide and 9 inches long were provided for use in the tank. The baffles were prepared from the same type of stainless steel sheet as used for the tank walls. A tight fit between baffles and tank walls prevented liquid carrying entrained gas from leaking or seeping around the vertical edges of the baffles. Six of the baffles were disposed in the tank transversely to the direction of liquid flow. These baffles were spaced ⅞ inch to 1 inch above the bottom and approximately 1 inch apart.

Using this apparatus, the 50 percent caustic soda solution was completely degassed and discharged as a clear liquid at a continuous flow rate of 5 gallons per minute.

Similar results were obtained in this apparatus using baffles made of polystyrene instead of stainless steel.

By way of comparison, attempts were made to operate the unit under other conditions of baffling the liquid: (1) with all of the baffles removed, (2) with the baffles disposed 2 inches above the bottom of the tank, and (3) with every other baffle removed so that the remaining baffles, i.e., half of the original number of baffles, were spaced 2 inches apart. On attempting to operate the unit in any of these three conditions, the maximum flow rate of clear liquid on a continuous basis was not above 1.87 gallons per minute.

The flow of clear liquid in the test according to the invention was thus over two and one-half times that of the maximum flow obtainable with other baffle arrangements.

The method and apparatus of the invention having been described, modifications thereof will at once be apparent to those skilled in the art, and the scope of the invention is to be considered limited only by the hereinafter appended claims.

We claim:
1. Apparatus for degassing a stream of liquid having gas bubbles entrained therein which comprises:
   (a) a generally rectangular tank having sidewalls, endwalls and a bottom;
   (b) said tank having a fluid inlet at one endwall near the top thereof and a fluid outlet at the opposite endwall near the bottom thereof;
   (c) associated with said tank, transducer means for imparting ultrasonic vibrations to liquid in the tank;
   (d) flow control means for controlling the liquid level of the stream flowing through the tank at a level slightly above the fluid inlet and at a height equal to the sum of an odd number of quarter wavelengths of the vibrations imparted to the liquid by the transducer;
   (e) a plurality of baffles disposed in the tank so as to direct liquid flow between the fluid inlet and fluid outlet, along the bottom of the tank, said baffles extending completely from sidewall to sidewall and making a tight fit against the sidewalls, said baffles being disposed above the bottom of the tank a distance equal to the sum of at least one odd number of quarter wavelengths of the vibrations imparted to the liquid, said baffles having a vertical length equal to the sum of an even number of quarter wavelengths of the vibrations imparted to the baffles via the liquid, and said baffles extending slightly above the liquid level that the said flow control means is adapted to maintain.
2. The apparatus as in claim 1 in which the baffles are spaced apart a quarter wavelength of the ultrasonic vibrations imparted to the liquid in the tank.
3. The apparatus as in claim 1 in which the baffles are disposed substantially in the vertical position.
4. The apparatus as in claim 1 in which the baffles are disposed substantially transverse to the direction of liquid flow between the fluid inlet and the fluid outlet.
5. The apparatus as in claim 1 in which the means of controlling the liquid level is an unsiphonable seal loop swing line.
6. The apparatus as in claim 1 in which the transducer means is a piezoelectric-type transducer.
7. The apparatus as in claim 1 in which the transducer means is a magnetostrictive-type transducer.
8. The apparatus as in claim 1 in which the transducer means is positioned below and coupled to the bottom of the tank.
9. The apparatus as in claim 1 in which the transducer means is disposed inside and on the bottom of the tank.

10. Apparatus for degassing a stream of liquid having gas bubbles entrained therein which comprises:
   (a) a generally rectangular tank having sidewalls, endwalls and a bottom, said tank having a fluid inlet at one endwall near the top thereof and a fluid outlet at the opposite endwall near the bottom thereof;
   (b) associated with said tank, transducer means for imparting ultrasonic vibrations to liquid in the tank;
   (c) flow control means for controlling the liquid level of the stream flowing through the tank at a level slightly above the fluid inlet;
   (d) a plurality of baffles substantially vertically disposed in the tank so as to direct liquid flow between the fluid inlet and fluid outlet, along the bottom of the tank, said baffles extending completely from sidewall to sidewall in sealing relation thereto, said baffles being disposed above the bottom of the tank a distance equal to the sum of at least one odd number of quarter wavelengths of the vibrations imparted to the liquid, and said baffles extending at least slightly above the liquid level that the said flow control means is adapted to maintain.
11. The method of degassing a stream of liquid containing gas bubbles which comprises:
   (a) continuously passing a stream of liquid containing gas bubbles into a tank having the inlet slightly below the dynamic liquid level in the tank and having the outlet near the bottom of the tank while applying ultrasonic vibrations to the liquid in the tank by means of a transducer positioned below said liquid;
   (b) flowing the liquid in an unrestricted stream along the bottom of the tank from the inlet to the outlet at a depth which is an odd number of quarter wavelengths of the ultrasonic vibrations imparted to the liquid by the transducer while maintaining a plurality of portions of the liquid in a series of relatively quiescent zones above the flowing stream and in contact therewith;
   (c) limiting and defining the dimensional limits of the respective quiescent zones by means of the side walls of the tank, the flowing unrestricted stream and a plurality of substantially vertically disposed spaced apart baffles, said baffles being positioned above the bottom of the tank a distance which is an odd number of quarter wavelengths of the ultrasonic vibrations imparted to the liquid by the transducer, said baffles having a vertical length equal to the sum of an even number of quarter wavelengths of the ultrasonic vibrations imparted to the baffles and said baffles extending slightly above the dynamic liquid level in the tank;
   (d) said dynamic liquid level being maintained at a height equal to the sum of an odd number of quarter wavelengths of the ultrasonic vibrations imparted to the liquid;
   (e) and continuously exiting the stream from the tank opposite the inlet and near the bottom of the tank.

References Cited by the Examiner

UNITED STATES PATENTS

| | | | |
|---|---|---|---|
| 2,257,997 | 10/1941 | Barnes | 55—15 |
| 2,363,247 | 11/1944 | Holder | 55—15 X |
| 2,508,528 | 5/1950 | McPherson | 55—158 |
| 2,620,894 | 12/1952 | Peterson et al. | 55—15 |
| 2,627,366 | 2/1953 | Glick | 55—18 |
| 2,688,402 | 9/1954 | Butterworth. | |
| 3,032,199 | 5/1962 | Sumiya | 209—170 |
| 3,076,544 | 2/1963 | Bodine | 209—1 |
| 3,160,138 | 12/1964 | Platzman. | |

SAMIH N. ZAHARNA, *Primary Examiner.*

REUBEN FRIEDMAN, *Examiner.*

J. ADEE, *Assistant Examiner.*